United States Patent [19]

Yamamoto

[11] Patent Number: 5,429,671

[45] Date of Patent: Jul. 4, 1995

[54] INK, AND INK-JET RECORDING METHOD AND APPARATUS EMPLOYING THE INK

[75] Inventor: Takao Yamamoto, Isehara, Japan

[73] Assignee: Canon Kabushiki Kaisha, Tokyo, Japan

[21] Appl. No.: 207,148

[22] Filed: Mar. 8, 1994

[30] Foreign Application Priority Data

Mar. 12, 1993 [JP] Japan ................... 5-077388

[51] Int. Cl.⁶ ............................................. C09D 11/02
[52] U.S. Cl. ................... 106/22 K; 106/20 D
[58] Field of Search ................. 106/22 K, 20 D

[56] References Cited

U.S. PATENT DOCUMENTS

| | | | |
|---|---|---|---|
| 5,017,227 | 5/1991 | Koike et al. | 106/22 |
| 5,059,246 | 10/1991 | Yamamoto et al. | 106/22 |
| 5,074,914 | 12/1991 | Shirota et al. | 106/22 K |
| 5,082,496 | 1/1992 | Yamamoto et al. | 106/22 |
| 5,110,356 | 5/1992 | Shirota et al. | 106/22 |
| 5,118,737 | 6/1992 | Baxter et al. | 106/22 K |
| 5,123,960 | 6/1992 | Shirota et al. | 106/22 |
| 5,127,946 | 7/1992 | Eida et al. | 106/22 |
| 5,130,723 | 7/1992 | Yamamoto et al. | 346/1.1 |
| 5,135,570 | 8/1992 | Eida et al. | 106/22 |
| 5,135,571 | 8/1992 | Shirota et al. | 106/22 K |
| 5,139,573 | 8/1992 | Yamamoto et al. | 106/22 |
| 5,167,703 | 12/1992 | Eida et al. | 106/22 K |
| 5,178,671 | 1/1993 | Yamamoto et al. | 106/22 K |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,216,437 | 6/1993 | Yamamoto et al. | 346/1.1 |
| 5,231,417 | 7/1993 | Shirota et al. | 346/1.1 |
| 5,250,121 | 10/1993 | Yamamoto et al. | 106/22 R |
| 5,258,505 | 11/1993 | Eida et al. | 534/680 |

FOREIGN PATENT DOCUMENTS

| | | |
|---|---|---|
| 54-59936 | 5/1979 | Japan . |
| 58-176277 | 10/1983 | Japan . |
| 59-78273 | 5/1984 | Japan . |
| 60-81266 | 5/1985 | Japan . |
| 62-187773 | 8/1987 | Japan . |
| 62-190271 | 8/1987 | Japan . |
| 62-199665 | 9/1987 | Japan . |
| 62-199666 | 9/1987 | Japan . |
| 62-199667 | 9/1987 | Japan . |
| 64-53976 | 3/1989 | Japan . |
| 1135880 | 5/1989 | Japan . |
| 1193375 | 8/1989 | Japan . |

*Primary Examiner*—Helene Klemanski
*Attorney, Agent, or Firm*—Fitzpatrick, Cella, Harper & Scinto

[57] ABSTRACT

Provided is an ink comprising at least a dye and a liquid medium, the dye being represented by the general formula

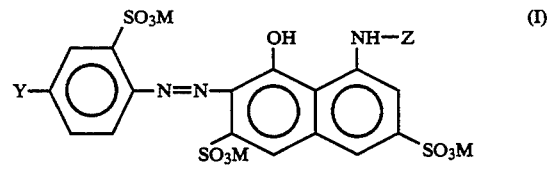

wherein Y is a linear or branched alkyl group having 5 to 12 carbons; Z is a benzoyl group, a radical of the formula $-SO_2C_6H_5$ or $-SO_2C_6H_4-CH_3$, and M is an alkali metal or ammonium.

15 Claims, 3 Drawing Sheets

F I G. 4
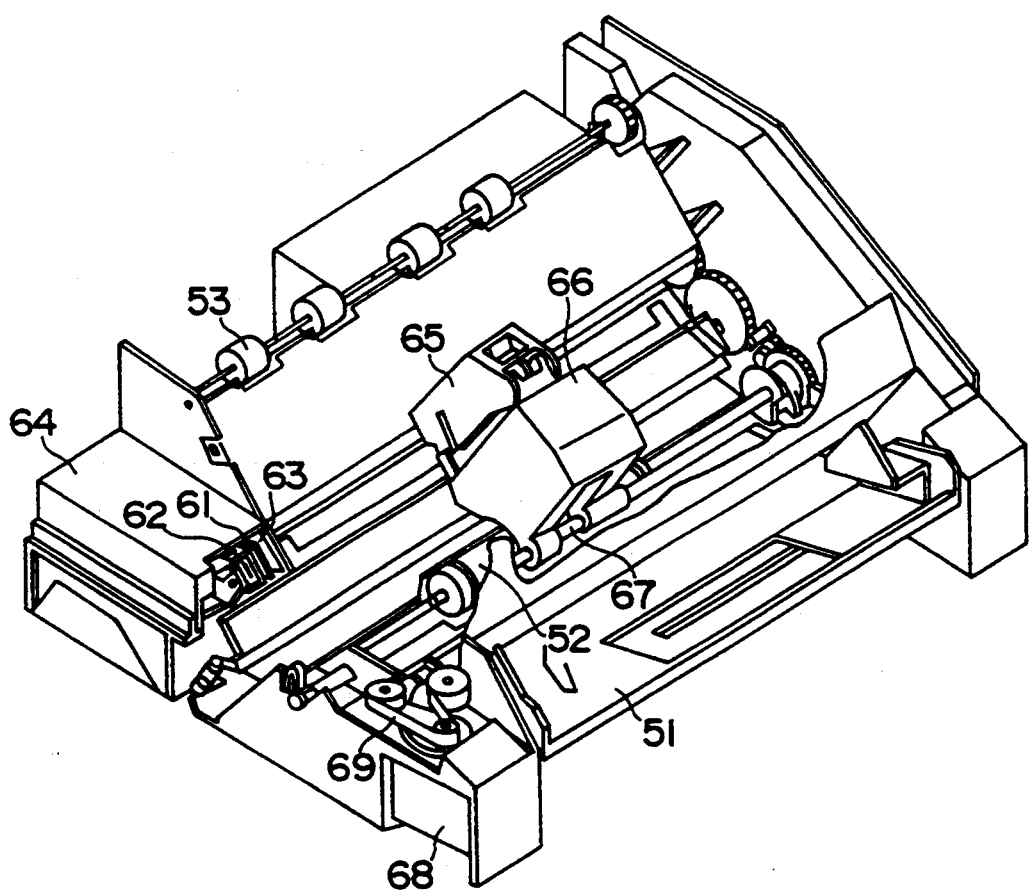

INK, AND INK-JET RECORDING METHOD AND APPARATUS EMPLOYING THE INK

BACKGROUND OF THE INVENTION

1. Field of the Invention

The present invention relates to an ink, a recording method employing the ink, and an apparatus charged with the ink. In particular, the present invention relates to an ink which exhibits less blurring of images recorded on a recording medium which has an ink-receiving surface layer composed of a binder and a pigment, a recording method employing the ink, and an apparatus charged with the ink.

1. Related Background Art

Conventionally, for ink-jet recording, an aqueous ink is used which comprises a water-soluble dye and an aqueous medium for solving the dye. The ink for ink-jet recording needs to meet the requirements below:

(1) The ink gives an image of sufficient density.
(2) The ink dries quickly on a recording medium.
(3) Feathering on a recorded image appears little.
(4) The recorded image does not flow out when the image is brought into contact with water or alcohol, or is decipherable enough even if some flow-out of the ink occurs (water-fastness).
(5) The ink or the recorded image has sufficient light-fastness.
(6) The ink does not clog at a penpoint or an ink nozzle.
(7) The ink is stably ejected during continuous recording or after interruption of recording for a long time without causing defects such as blurring of a recorded image (ejection stability).
(8) The ink is stable in storage.
(9) The ink does not damage members brought into contact with the ink.
(10) The ink is safe for persons handling the ink, the safety including negativeness in Ames test.

In ink-jet recording utilizing thermal energy, the ink needs further to meet an additional requirement below:

(11) The ink has a sufficient thermal stability, and does not adversely affect a thermal energy-generating means.

Black inks which meet the above requirements on plain paper are disclosed in Japanese Patent Application Laid-Open Nos. 1-135880 and 1-193375. A color ink for full-color image formation is disclosed in Japanese Patent Application Laid-Open No. 62-199667. The inks of prior art, however, do not necessarily satisfy all the requirements enumerated above.

In particular, in full-color image formation, a problem remains unsolved that a formed image blurs after leaving it for a long term. For full-color image recording, in order to obtain sharp images, recording mediums (coated paper) are usually used which have ink-receiving surface layer comprising a pigment and a binder. The coated paper causes significantly the above-mentioned blurring.

Of four colors including black, cyan, magenta, and yellow, the magenta color is especially liable to cause blurring, and in an extreme case, the printed letters have peripheral margins of magenta color, which impairs remarkably the image quality after leaving it for a long time.

Examples of magenta dyes are disclosed in Japanese Patent Application Laid-Open Nos. 58-176277, 59-78273, 60-81266, 62-190271, 62-199665 to 62-199667, and 1-53976. Each of these dyes has both advantages and disadvantages: some dyes are excellent in light-fastness, but give unclear color; some dyes are satisfactory in water-fastness and non-bleeding, but are poor in light-fastness; and some dyes are satisfactory in light-fastness and water-fastness, but discolor even under room conditions.

Japanese Patent Application Laid-Open No. 62-187773 discloses the use of a dye of the formula

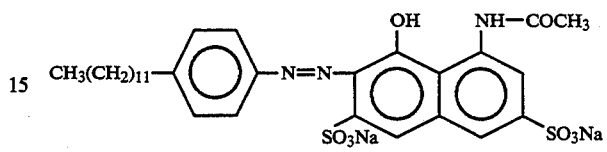

However, this dye has disadvantages in light-fastness and storage stability.

SUMMARY OF THE INVENTION

An object of the present invention is to provide a magenta ink which satisfies the aforementioned general requirements, causes less blurring of images after leaving them for a long term, and gives images which discolor less under room conditions.

Another object of the present invention is to provide a recording method which employs the above ink.

A further object of the present invention is to provide an apparatus which employs the above ink.

The ink of the present invention comprises at least a dye and a liquid medium, the dye being represented by the general formula

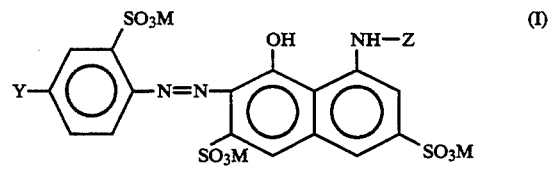

wherein Y is a linear or branched alkyl group having 5 to 12 carbons; Z is a benzoyl group, a radical of the formula $-SO_2C_6H_5$ or $-SO_2C_6H_4-CH_3$; and M is an alkali metal or ammonium.

BRIEF DESCRIPTION OF THE DRAWINGS

FIG. 4 is a schematic perspective view of an ink-jet recording apparatus having the above head mounted thereon.

DETAILED DESCRIPTION OF THE PREFERRED EMBODIMENTS

Figure 1:
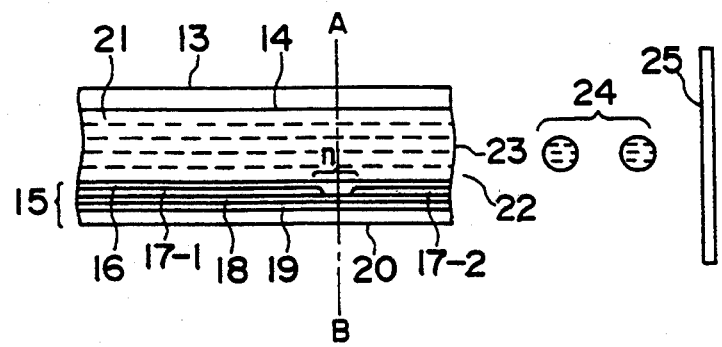
FIG. 1 is a schematic sectional view of a recording head of an ink-jet recording method of the present invention.

The ink comprising the dye represented by the general formula (I) enables formation, on a coated paper sheet, of an image which does not blur after leaving it for a long time and which is of high quality and high resolution, exhibiting less discoloration, and having high fastnesses.

The ink of the present invention is useful for ink-jet recording in which ink is ejected by action of thermal energy. In the ink-jet recording, the ink does not form a sticking matter on the heater and can be used stably for a long time. Further, the ink neither deteriorates in its properties nor forms solid deposit.

By use of a dye of the specified structure as the coloring matter, the ink satisfies the above-mentioned general requirements, and gives an image which does not blur even when the images is formed on a coated paper sheet and left for a long term, and which has excellent lightfastness and is less liable to discolor in a room conditions.

The present invention is described below in more detail by reference to preferred embodiments.

Any of the dyes employed in the present invention has generally a sodium salt form of a water-solubilizing group such as a sulfo group. However, the dye of the present invention is not limited to a sodium salt form, but a salt form with potassium, lithium, ammonia, or organic amines such as an alcoholamine are also effective similarly, and such salts are included in the present invention.

The dye represented by the above general formula (I) is exemplified specifically by the dyes of the structural formula below. In the general formula (I), the substituent Y is preferably a branched or non-branched alkyl group of 5 to 12 carbons for the purpose of obtaining desirable magenta color and of preventing blurring. If the substituent is linked with interposition of an amino group, the color tone deviates greatly from magenta.

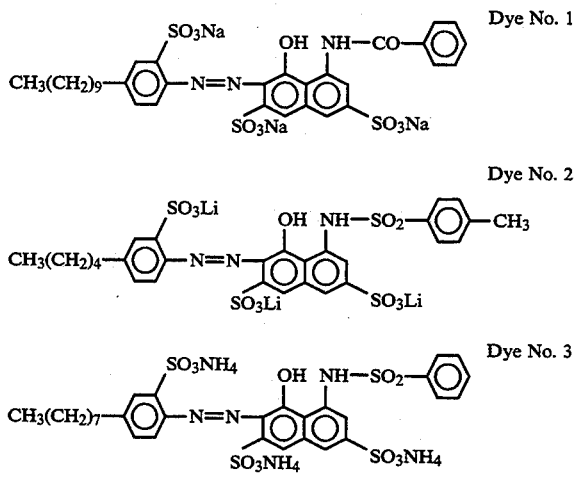

The amount of the dye to be used in the ink of the present invention is generally in the range of from 0.1 to 15% by weight, preferably from 0.3 to 10% by weight, more preferably from 0.5 to 6% by weight of the total weight of the ink, but is not limited thereto.

The suitable aqueous medium for the ink of the present invention is water or a mixed solvent composed of water and a water-soluble organic solvent. The water is not common water containing various ions, but preferably deionized water.

The water-soluble organic solvent to be mixed with water includes conventional water-soluble organic solvents used in ink-jet recording. In particular, glycerin and polyethylene oxide of polymerization degree of 3 to 6 are effective in prevention of clogging of nozzles by inks. Nitrogen-containing cyclic compounds and polyalkylene oxide ethers are effective in improvement of image density and ink ejection stability. Lower alcohols and surfactants are effective in improvement of frequency response. Accordingly, preferred solvent compositions in the present invention contain the above various solvent components in addition to water.

The above water-soluble organic solvent is contained in the ink in an amount of generally from 2 to 80% by weight, preferably from 3 to 70% by weight, more preferably from 4 to 60% by weight.

The water is used in an amount of not less than 10% by weight, preferably from 10 to 97.5% by weight. Use of less amount of the water is undesirable since it increases the amount of a less volatile organic solvent remaining in the formed image to cause migration of the dye or blurring of the formed image.

The ink of the present invention may contain a pH-adjusting agent, a viscosity-adjusting agent, a surface tension-adjusting agent, or the like in addition to the above components, if necessary. The pH-adjusting agent includes organic amines such as diethanolamine and triethanolamine; inorganic alkaline salts such as alkali metal hydroxides, e.g., sodium hydroxide, lithium hydroxide, potassium hydroxide, etc.; organic acid salts such as lithium acetate; organic acids, inorganic acids, and so forth.

The ink of the present invention as described above has a viscosity at 25° C. of from 1 to 20 cP, preferably from 1 to 15 cP, a surface tension of not less than 30 dyn/cm, preferably not less than 40 dyn/cm, and pH of from about 3 to about 10.5.

The ink of the present invention is effectively used in ink-jet recording and in the use of coated paper as a recording medium which allows formation of an image with high sharpness and high resolution.

The ink-jet recording may be conducted by any conventionally known method. For example, the method and the apparatus disclosed in Japanese Patent Application Laid-Open No. 54-59936 are useful where the ink is ejected through a nozzle by a force given by abrupt volume change of the ink on receiving thermal energy.

Figure 2:
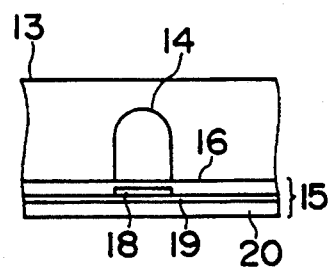
FIG. 2 is a schematic sectional view of the recording head at the line A-B in FIG. 1.
Figure 3:
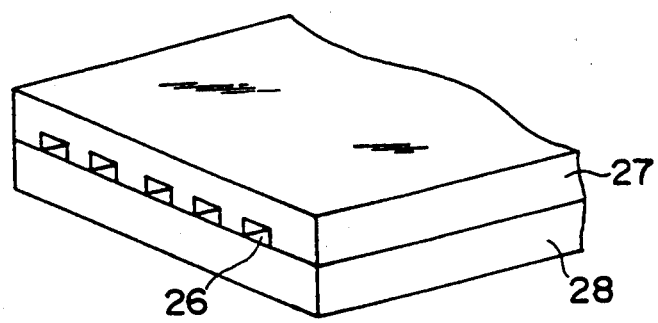
FIG. 3 illustrates schematically an external appearance of a multiple head having a plurality of heads of FIG. 1 in juxtaposition.

One example of the ink-jet recording apparatus of the present invention is explained below. FIGS. 1, 2, and 3 illustrate construction of a head which is the essential part of the apparatus.

In the drawings, the head 13 is constructed by bonding a plate of glass, ceramics, or plastics having grooves 14 for ink flow with a heating head 15 for thermal recording. (The head is not limited to the one as shown in the drawings.) The heating head 15 is constituted of a protection layer 16 formed of silicon oxide or the like, aluminum electrodes 17-1, 17-2, a heating resistor layer 18 made of nichrome or the like, a heat-accumulating layer 19, and a heat-radiating substrate plate 20 made of alumina or the like.

The ink 21 reaches an ejection orifice (fine nozzle) 22, and a meniscus 23 is formed there by a pressure P.

On application of an electric signal information to the electrodes 17-1, 17-2 of the head, the region denoted by a symbol "n" on the heating head 15 generates heat abruptly to form bubbles in the ink 21 on the region, the pressure of the bubble pushes out the meniscus 23, and ejects ink from the orifice 22 in a shape of droplets 24. The ejected ink droplets travel toward a recording medium 25.

FIG. 3 shows an appearance of a multiple head having a plurality of the above head in juxtaposition. The multiple head is formed by bonding a glass plate 27 having multiple grooves 26 with the heating head 28 like the one shown in FIG. 1.

FIG. 1 is a sectional view of the head 13 along the ink flow path. FIG. 2 is a sectional view of the head at the line A-B in FIG. 1.

The ink in the present invention can be maintained at an operating temperature (a controlled recording temperature) by heating the substrate plate 20 to keep whole the head at a constant temperature, or by the like method.

The ink of the present invention kept at an operating temperature as above has a viscosity lower than that at non-operating conditions owing to the action of a compound having a thermally reversible gelation characteristics, thereby the head exhibiting a satisfactory ejection characteristics.

FIG. 4 illustrates an example of the ink-jet recording apparatus having such a head mounted thereon. In FIG. 4, a blade 61 as a wiping member is held at one end of the blade by a blade-holding member, forming a fixed end in a shape of a cantilever. The blade 61 is placed at a position adjacent to the recording region of the recording head, and, in this example, is held so as to protrude into the moving path of the recording head.

The cap 62 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head in a manner similar to that of the blade 61.

The blade 61, the cap 62, and the absorbent 63 constitute an ejection recovery device 64. The blade 61, and the absorbent 63 serve to remove off water, dust, and the like from the face of the ink ejection nozzle.

A recording head 65 has an energy-generating means for the ejection, and conducts recording by ejecting the ink onto a recording medium opposing to the ejection nozzle face. A carriage 66 is provided for supporting and moving the recording head 65.

The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery device 51 for delivery of a recording medium and a paper delivery roller 52 driven by a motor (not shown in the drawing) delivers a recording medium to the position opposing to the ejection nozzle face of the recording head, and the recording medium is delivered with the progress of the recording to a paper discharge device provided with paper-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face.

When the recording head 65 is made to move from the home position to the record-starting position, the cap 62 and the blade 61 are at the same position as in the above-mentioned wiping step, so that the ejection nozzle face of the recording head is wiped also in this movement. The recording head is moved to the home position not only at the completion of the recording and at the time of ejection recovery, but is also moved at a predetermined intervals during recording from the recording region. The nozzle is wiped by such movement.

Figure 5:
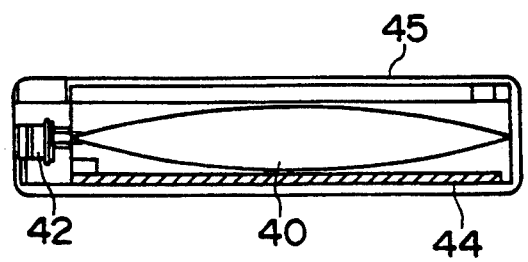
FIG. 5 is a schematic sectional view of an ink cartridge for supplying an ink to the above head.

FIG. 5 is a sectional view of an example of the ink cartridge which holds an ink to be supplied through an ink supplying member such as a tube. The ink container 40, for example an ink bag, contains an ink to be supplied, and has a rubber plug 42 at the tip. Insertion of a needle (not shown in the drawing) into the plug 42 enables supply of the ink from the ink bag 40. A waste-ink absorbent 44 serves to absorb a waste ink. The liquid-contacting surface of the ink container is preferably made of polyolefin, particularly preferably made of polyethylene in the present invention.

Figure 6:
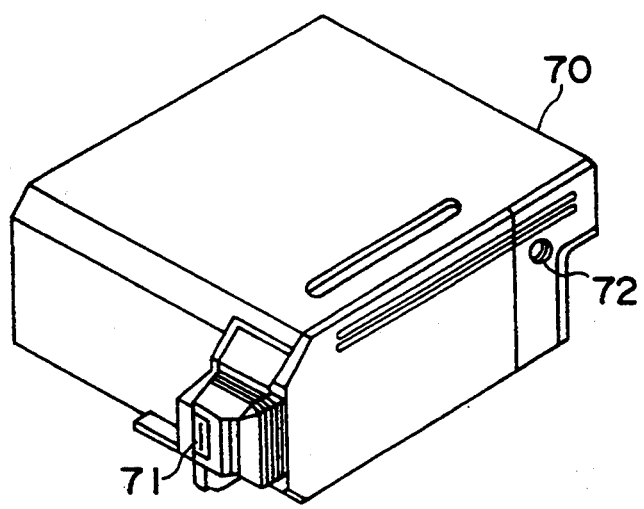
FIG. 6 illustrates schematically an appearance of an essential part of the ink-jet recording apparatus in which the head and the ink cartridge are integrated.

The ink-jet recording apparatus used in the present invention is not limited to the above-mentioned one which has separately a head and an ink cartridge. Integration thereof as shown in FIG. 6 may suitably be employed. In FIG. 6, a recording unit 70 houses an ink holding member such as an ink absorbent, and the ink in the absorbent is ejected from a plurality of orifices of a head 71.

The ink absorbent is made preferably of polyurethane, cellulose, or polyvinyl acetal. An air-communication opening 72 is provided to communicate interior of the cartridge with the open air. The recording unit 70 may be used in place of the recording head shown in FIG. 3, and is made to be readily mountable to and demountable from the carriage 66.

The recording medium employed in the present invention may be made of any material including plain paper sheets, coated paper sheets, and plastic films for OHP and other uses. In particular, coated paper exhibits remarkable effects. Generally, the coated paper has an ink-receiving surface layer composed of a pigment and a binder on a plain paper or a wood-free paper as the base material. In the present invention, the coated paper includes the one having, in the ink receiving layer, paper fibers of the base material mixed therein.

The present invention is described below in more detail by reference to Examples and Comparative Examples. In the description below, "%" is based on weight, unless otherwise mentioned. The degree of blurring was estimated by comparison with inks prepared by mixing C.I. Direct Blue 199 (non-blurring dye), and a dye of the present invention.

The dyes used were synthesized according to a conventional method as below.

A solution of p-n-decylaniline-o-sulfonic acid was diazotized with sodium nitrite, and the diazotized product was coupled with benzoyl H-acid at pH 4 to 7. After the reaction, the product was salted out by addition of sodium sulfate, and collected by filtration. The collected matter was dissolved again in water, and deposited by addition of isopropyl alcohol for desalting to obtain Dye No.1. Dyes No.2 and No.3 were synthesized in a similar manner.

Inks of the Examples were prepared by mixing the components below.

EXAMPLE 1

| Dye No. 1 | 1.5% |
| --- | --- |
| C.I. Direct Blue 199 | 1.5% |
| Diethylene glycol | 30% |
| Deionized water | 67% |

EXAMPLE 2

| Dye No. 2 | 1.5% |
| --- | --- |
| C.I. Direct Blue 199 | 1.5% |
| Diethylene glycol | 20% |
| Polyethylene glycol | 10% |
| (Average molecular weight 300) | |
| Deionized water | 67% |

EXAMPLE 3

| Dye No. 3 | 1% |
| --- | --- |
| C.I. Direct Blue 199 | 1% |
| Diethylene glycol | 15% |
| N-methyl-2-pyrrolidone | 15% |
| Deionized water | 68% |

EXAMPLES 4 TO 6

Inks of single magenta color were prepared in Examples 4 to 6 by replacing the C.I. Direct Blue 199 in the above Examples respectively with each of the Examples 1 to 3.

Components mentioned above were mixed sufficiently to prepare each solution, and the solution was filtered with a Teflon filter of pore diameter of 0.22 μm under pressure to obtain each of inks of the present invention.

The ink was applied to an ink-jet printer, Model BJ-130A (manufactured by Canon K.K., having 48 nozzles) which employs heat-generating element as the ejection energy source. Solid printing was conducted with this printer in the area of 15 mm×30 mm on the recording mediums A and B mentioned below. The printed matter was tested for blurring (Examples 1 to 6), weatherability (Examples 4 to 6), and discoloration (Examples 4 to 6).

Recording medium A: Coated paper for ink-jet printer manufactured by Sharp Corporation Recording medium B: Coated paper for PIXEL PRO manufactured by Canon K.K.

"Accelerated blurring test"

The printed matter was left standing in the atmosphere of 30° C. and 80% RH for 48 hours. As the results, no blurring was observed satisfactorily in any of the Examples.

"Weatherability test method"

The printed matter was placed in a light exposure tester (Fade-O-meter, Model Ci35, manufactured by Atlas Electric Devices Co., Chicago, Ill.) for 100 hours. The color difference $\Delta E^*_{ab}$ caused by the test was obtained by measurement before and after the test. In any of Examples the value of $\Delta E^*_{ab}$ was not more than 15, and less discoloration was observed to obtain a satisfactory result.

"Accelerated discoloration test"

The printed matter was left standing for 120 minutes in a dark chamber in which ozone concentration was kept at 3±2 ppm The color difference $\Delta E^*_{ab}$ before and after the test was measured according to JIS Z-8730. In any of Examples the value of $\Delta E^*_{ab}$ was not more than 10, and less discoloration was observed to obtain a satisfactory result.

For comparison, the components below was mixed in the same manner as in Examples above to prepare inks. With these inks, solid printing was made on the recording mediums A and B by means of the same recording apparatus as above. The printed matters were tested for blurring, and discoloration. The printed matter of Comparative Example 1 exhibited significant blurring and discoloration. The printed matters of Comparative Examples 2 to 4 exhibited less blurring, but significant discoloration as magenta single color.

Comparative Example 1

| C.I. Acid Red 35 | 1.5% |
| --- | --- |
| C.I. Direct Blue 199 | 1.5% |
| Diethylene glycol | 30% |
| Deionized water | 67%. |

Comparative Example 2

| C.I. Reactive Red 23 | 1.5% |
| --- | --- |
| C.I. Direct Blue 199 | 1.5% |
| Diethylene glycol | 20% |
| Polyethylene glycol | 10% |
| (Average molecular weight 300) | |
| Deionized water | 67%. |

Comparative Example 3

| C.I. Reactive Red 23 | 3% |
| --- | --- |
| Diethylene glycol | 20% |
| Polyethylene glycol | 10% |
| (Average molecular weight 300) | |
| Deionized water | 67%. |

Comparative Example 4

| Dye of the formula | 3% |
| --- | --- |

$$CH_3(CH_2)_{11}-\bigcirc-N=N-\underset{SO_3Na}{\overset{OH \quad NH-COCH_3}{\bigcirc\bigcirc}}-SO_3Na$$

| Thiodiglycol | 5% |
| --- | --- |
| Urea | 5% |
| Glycerol | 5% |
| Isopropyl alcohol | 5% |
| Deionized water | 77%. |

The ink comprising the dye represented by the general formula (I) of the present invention enables formation, on a coated paper sheet, of an image which does not blur after leaving it for a long time, and which is of high quality and high resolution, exhibiting less discoloration, and having high fastnesses.

The ink of the present invention is useful for ink-jet recording in which ink is ejected by action of thermal energy. In the ink-jet recording, the ink does not form a sticking matter on the heater and can be used stably for a long time. Further, the ink neither deteriorates in its properties nor forms solid deposit.

By use of a dye of the specified structure as the coloring matter, the ink satisfies the above-mentioned general requirements, and give an image which does not blur even when the images is formed on a coated paper sheet and left for a long term, and which has excellent light-fastness and is less liable to discolor in a room conditions.

What is claimed is:

1. An ink comprising at least a dye and a liquid medium, the dye being represented by the general formula

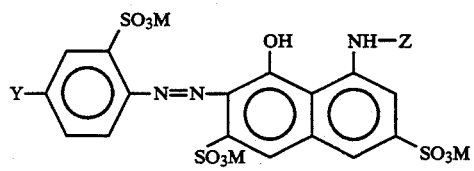

wherein Y is a linear or branched alkyl group having 5 to 12 carbons; Z is a benzoyl group, a radical of the formula —SO$_2$C$_6$H$_5$ or —SO$_2$C$_6$H$_4$—CH$_3$; and M is an alkali metal or ammonium.

2. The ink according to claim 1, wherein the ink comprises the dye of the general formula (I) in an amount of from 0.5 to 10% by weight and a polyhydric alcohol or a polyhydric alcohol ether in an amount of from 2 to 80% by weight.

3. The ink according to claim 1, wherein the ink comprises the dye of the general formula (I) in an amount of from 0.5 to 10% by weight, a polyhydric alcohol or a polyhydric alcohol ether in an amount of from 2 to 80% by weight and water in an amount of from 10 to 97.5% by weight, and have a pH-value of from 3 to 10.5.

4. An ink-jet recording method in which droplets of an ink are ejected through an orifice in correspondence with recording signals to conduct recording, said ink comprising at least a dye and a liquid medium, the dye being represented by the general formula

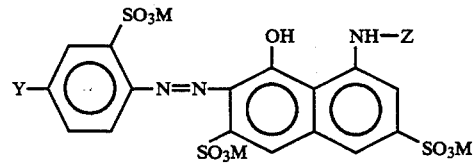

wherein Y is a linear or branched alkyl group having 5 to 12 carbons; Z is a benzoyl group, a radical of the formula —SO$_2$C$_6$H$_5$ or —SO$_2$C$_6$H$_4$—CH$_3$; and M is an alkali metal or ammonium.

5. The ink-jet recording method according to claim 4, wherein the droplets of the ink is ejected by applying thermal energy to the ink.

6. The ink jet recording method according to claim 5, wherein said droplets of ink are ejected on coated paper.

7. A recording unit having an ink container for holding ink, and a head to eject the ink in a form of droplets, said ink comprising at least a dye and a liquid medium, the dye being represented by the general formula

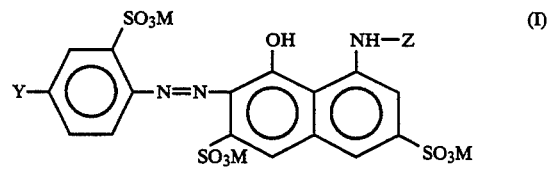

wherein Y is a linear or branched alkyl group having 5 to 12 carbons; Z is a benzoyl group, a radical of the formula —SO$_2$C$_6$H$_5$ or —SO$_2$C$_6$H$_4$—CH$_3$; and M is an alkali metal or ammonium.

8. The recording unit according to claim 7, wherein the head ejects the droplets of the ink by applying thermal energy to the ink.

9. An ink cartridge having an ink container for holding an ink, said ink comprising at least a dye and a liquid medium, the dye being represented by the general formula

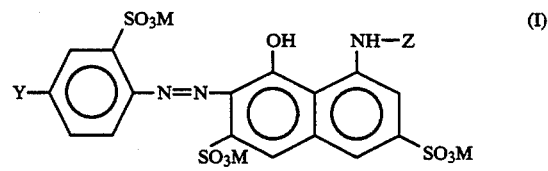

wherein Y is a linear or branched alkyl group having 5 to 12 carbons; Z is a benzoyl group, a radical of the formula —SO$_2$C$_6$H$_5$ or —SO$_2$C$_6$H$_4$—CH$_3$; and M is an alkali metal or ammonium.

10. The ink cartridge according to claim 9, wherein the ink container has a liquid-contacting face formed from polyolefin.

11. An ink-jet recording apparatus equipped with a recording unit having an ink container for holding ink, and a head to eject the ink in a form of droplets, said ink comprising at least a dye and a liquid medium, the dye being represented by the general formula

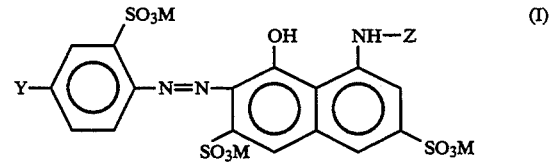

wherein Y is a linear or branched alkyl group having 5 to 12 carbons; Z is a benzoyl group, a radical of the formula —SO$_2$C$_6$H$_5$ or —SO$_2$C$_6$H$_4$—CH$_3$; and M is an alkali metal or ammonium.

12. The ink-jet recording apparatus according to claim 11, wherein the head ejects the droplets of the ink by applying thermal energy to the ink.

13. An ink-jet recording apparatus equipped with a recording head for ejecting droplets of an ink, an ink cartridge having an ink container for holding the ink, and an ink delivery device for delivering the ink from the ink cartridge to the recording head, said ink comprising at least a dye and a liquid medium, the dye being represented by the general formula

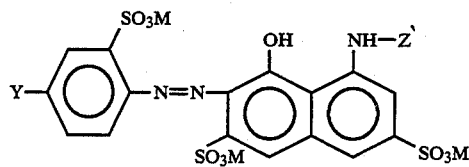 (I)

wherein Y is a linear or branched alkyl group having 5 to 12 carbons; Z is a benzoyl group, a radical of the formula $-SO_2C_6H_5$, or $-SO_2C_6H_4-CH_3$; and M is an alkali metal or ammonium.

14. The ink-jet recording apparatus according to claim 13, wherein the head ejects the droplets of the ink by applying thermal energy to the ink.

15. The ink-jet recording apparatus according to claim 14, wherein the ink container has a liquid-contacting face formed from polyolefin.

* * * * *

UNITED STATES PATENT AND TRADEMARK OFFICE
CERTIFICATE OF CORRECTION

PATENT NO. : 5,429,671     Page 1 of 2

DATED : July 4, 1995

INVENTOR(S) : TAKAO YAMAMOTO

It is certified that error appears in the above-indentified patent and that said Letters Patent is hereby corrected as shown below:

Title page, item

[56] References Cited

Foreign Patent Documents, "1135880" should read --1-135880-- and
      "1193375" should read --1-193375--.

Column 1

Line 18, "solving" should read --dissolving--; and
    Line 56, "have" should read -- have an--.

Column 3

Line 19, "images" should read --image--.

Column 5

Line 8, "head" should read --heads--.

Column 7

Line 68, "Examples" should read --Examples,--.

Column 8

Line 8, "Examples" should read --Examples,--; and
    Line 11, "was" should read --were--.

UNITED STATES PATENT AND TRADEMARK OFFICE
CERTIFICATE OF CORRECTION

PATENT NO. : 5,429,671
DATED : July 4, 1995
INVENTOR(S) : TAKAO YAMAMOTO

It is certified that error appears in the above-indentified patent and that said Letters Patent is hereby corrected as shown below:

Column 9

Line 11, "give" should read --gives--;
Line 12, "images" should read --image--;
Line 41, "have" should read --has--; and
Line 62, "is" should read --are--.

Column 12

Line 1, "$SO_2C_6H_5$," should read --$SO_2C_6H_5$--.

Signed and Sealed this

Thirty-first Day of October 1995

Attest:

*Attesting Officer*

BRUCE LEHMAN

*Commissioner of Patents and Trademarks*